(12) United States Patent
Marshall et al.

(10) Patent No.: US 7,585,428 B1
(45) Date of Patent: Sep. 8, 2009

(54) ELECTROLYTE WITH ENHANCED LEAKAGE DETECTION FOR ELECTROLYTIC CAPACITORS AND METHOD FOR DETECTING LEAKAGE

(75) Inventors: Timothy R. Marshall, Pickens, SC (US); Jeffrey R. LeBold, Greer, SC (US)

(73) Assignee: Pacesetter, Inc., Sunnyvale, CA (US)

( * ) Notice: Subject to any disclaimer, the term of this patent is extended or adjusted under 35 U.S.C. 154(b) by 230 days.

(21) Appl. No.: 11/696,813

(22) Filed: Apr. 5, 2007

(51) Int. Cl.
*H01G 9/038* (2006.01)

(52) U.S. Cl. .................. 252/62.2; 252/964; 361/506

(58) Field of Classification Search ................ 252/62.2, 252/964; 361/506
See application file for complete search history.

(56) References Cited

U.S. PATENT DOCUMENTS

| | | | |
|---|---|---|---|
| 4,518,471 A | 5/1985 | Arora | |
| 4,525,249 A | 6/1985 | Arora | |
| 4,999,265 A * | 3/1991 | Dopp | 429/347 |
| 5,131,388 A | 7/1992 | Pless et al. | |
| 5,661,629 A | 8/1997 | MacFarlane et al. | |
| 5,965,062 A | 10/1999 | Sakata et al. | |
| 6,587,329 B1 * | 7/2003 | Feger | 361/504 |
| 6,589,441 B1 | 7/2003 | Feger | |
| 6,743,370 B1 * | 6/2004 | Feger et al. | 252/62.2 |
| 6,744,619 B1 * | 6/2004 | Feger | 361/506 |
| 2004/0197665 A1 | 10/2004 | Amine | |
| 2004/0262566 A1 * | 12/2004 | Takaoka et al. | 252/62.2 |
| 2005/0069761 A1 * | 3/2005 | Palanisamy et al. | 429/90 |

FOREIGN PATENT DOCUMENTS

| | | | |
|---|---|---|---|
| EP | 1675210 | * | 6/2006 |
| WO | 9806116 A1 | | 2/1998 |
| WO | 03083972 A1 | | 10/2003 |

* cited by examiner

*Primary Examiner*—C. Melissa Koslow
(74) *Attorney, Agent, or Firm*—Steven M. Mitchell

(57) ABSTRACT

A conductive electrolyte comprises an indicator dye for facilitating detection of electrolyte leakage in a high voltage electrolytic capacitor as well as for facilitating the determination as to when an electrolyte has reached a desired pH range. In a method for detecting electrolyte leakage, a capacitor comprising a flat stack of anodes enclosed in a housing with a lid and an electrolyte comprising an indicator dye is inspected for the presence of electrolyte leaking out of the capacitor. The indicator dye facilitates viewing leaking electrolyte. The indicator dye can be a coloring agent that changes the color of the electrolyte or can be a fluorescent that fluoresces when exposed to ultraviolet light. The indicator dye is also utilized as a pH indicator during the manufacture of electrolytic capacitors, wherein a base is introduced into an electrolyte having an indicator dye that changes pH when the electrolyte turns basic. The base is introduced into the electrolyte until the indicator dye causes the electrolyte to change color indicating the desired pH has been reached.

2 Claims, 2 Drawing Sheets

ELECTROLYTE WITH ENHANCED LEAKAGE DETECTION FOR ELECTROLYTIC CAPACITORS AND METHOD FOR DETECTING LEAKAGE

BACKGROUND OF THE INVENTION

1. Field of the Invention

The present invention relates to electrolytic capacitors and more particularly to an electrolyte containing an indicator dye and a method for detection of electrolyte leakage and electrolyte pH utilizing the electrolyte.

2. Background Art

Compact, high voltage capacitors are utilized as energy storage reservoirs in many applications, including implantable medical devices. These capacitors are required to have a high energy density since it is desirable to minimize the overall size of the implanted device. This is particularly true of an Implantable Cardioverter Defibrillator (ICD), also referred to as an implantable defibrillator, since the high voltage capacitors used to deliver the defibrillation pulse can occupy as much as one third of the ICD volume.

Implantable Cardioverter Defibrillators, such as those disclosed in U.S. Pat. No. 5,131,388, incorporated herein by reference, typically use two electrolytic capacitors in series to achieve the desired high voltage for shock delivery. For example, an implantable cardioverter defibrillator may utilize two 350 to 400 volt electrolytic capacitors in series to achieve a voltage of 700 to 800 volts.

Electrolytic capacitors are used in ICDs because they have the most nearly ideal properties in terms of size, reliability and ability to withstand relatively high voltage. Conventionally, such electrolytic capacitors include an etched aluminum foil anode, a cathode electrode, and an interposed kraft paper or fabric gauze separator impregnated with a solvent-based liquid electrolyte. While aluminum is the preferred metal for the anode plates, other metals such as tantalum, magnesium, titanium, niobium, zirconium and zinc may be used. A typical electrolyte may be a mixture of a weak acid and a salt of a weak acid, preferably a salt of the weak acid employed, in a polyhydroxy alcohol solvent. The electrolytic or ion-producing component of the electrolyte is the salt that is dissolved in the solvent. The entire laminate is rolled up into the form of a substantially cylindrical body, or wound roll, that is held together with adhesive tape and is encased, with the aid of suitable insulation, in an aluminum tube or canister. Connections to the anode and the cathode are made via tabs. Alternative flat constructions for aluminum electrolytic capacitors are also known, comprising a planar, layered, stack structure of electrode materials with separators interposed therebetween, such as those disclosed in the above-mentioned U.S. Pat. No. 5,131,388.

The need for high voltage, high energy density capacitors is most pronounced when employed in implantable cardiac defibrillators (ICDs). In ICDs, as in other applications where space is a critical design element, it is desirable to use capacitors with the greatest possible capacitance per unit volume. Since the capacitance of an electrolytic capacitor is provided by the anodes, a clear strategy for increasing the energy density in the capacitor is to minimize the volume taken up by paper and cathode and maximize the number of anodes. A multiple anode flat, stacked capacitor configuration requires fewer cathodes and paper spacers than a single anode configuration and thus reduces the size of the device. A multiple anode stack consists of a number of units consisting of a cathode, a paper spacer, two or more anodes, a paper spacer and a cathode, with neighboring units sharing the cathode between them. In order to achieve higher energy densities, it has been necessary to stack three, four and five anodes per layer.

In an implantable cardioverter device, one concern is leakage of electrolyte from the electrolytic capacitors within the finished device. Electrolyte can leak through the weld zones between the housing and lid of the capacitor or through the feed through and up the anode wire. Leakage of the electrolyte negatively affects the performance of the capacitor resulting in a drop in the amount of energy delivered. Visual inspection is the current method for detection, however this process is difficult and time consuming because current electrolytes are transparent or a pale yellow in color, making it difficult to visually detect leaks. There remains a need in the art for an improved electrolyte leakage detection method that minimizes the difficulty of inspection and improves the speed and accuracy of detection.

SUMMARY OF THE INVENTION

The present invention is directed to utilizing a conductive electrolyte comprising an indicator dye for facilitating detection of electrolyte leakage in a high voltage electrolytic capacitor as well as for facilitating the determination as to when an electrolyte has reached a desired pH range.

A representative conductive electrolyte for high voltage electrolytic capacitors according to the present invention comprises: a solvent; a dicarboxylic acid; a base; and an indicator dye. The solvent may be ethylene glycol or a mixture of ethylene glycol and 2-methoxyethanol; the dicarboxylic acid may be azelaic acid; the base may be one of ammonia, methylamine or dimethylamine; and the indicator may be one of fluorescein, resorcin blue, alizarin, curcumin, brilliant yellow or β-methylumbelliferone.

A method for detecting electrolyte leakage in a capacitor comprises: impregnating a capacitor with an electrolyte comprising an indicator dye; and inspecting said capacitor for the presence of said indicator dye, which indicates electrolyte leakage. The indicator dye can be a coloring agent that changes the color of the electrolyte or can be a fluorescent that fluoresces when exposed to ultraviolet light.

In one embodiment of the present invention the indicator dye is also utilized as a pH indicator during the manufacture of electrolytic capacitors, the method comprising: introducing a base into an electrolyte comprising ethylene glycol, a dicarboxylic acid and an indicator dye that changes pH when the electrolyte turns basic; and continuing to introduce said base until said indicator dye causes said electrolyte to change color. The method further comprises impregnating said electrolyte into a capacitor and inspecting said capacitor for the presence of said indicator dye, which indicates electrolyte leakage.

BRIEF DESCRIPTION OF THE DRAWINGS/FIGURES

DETAILED DESCRIPTION OF THE INVENTION

The present invention is directed to a method for detecting electrolyte leakage and electrolyte pH in a capacitor, a method for manufacturing an electrolytic capacitor and a conductive electrolyte for use in high voltage electrolytic capacitors. In particular the electrolyte according to the present invention comprises an indicator dye that facilitates detection of electrolyte leakage in a high voltage electrolytic capacitor and that also facilitates determination of when an electrolyte has reached a desired pH range.

Preferred embodiments of the present invention are now described. While specific configurations and arrangements are discussed, it should be understood that this is done for illustrative purposes only. A person skilled in the relevant art will recognize that other configurations and arrangements can be used without departing from the spirit and scope of the invention. It will also be apparent to a person skilled in the relevant art that this invention can be employed in a variety of other devices and applications.

Figure 1:
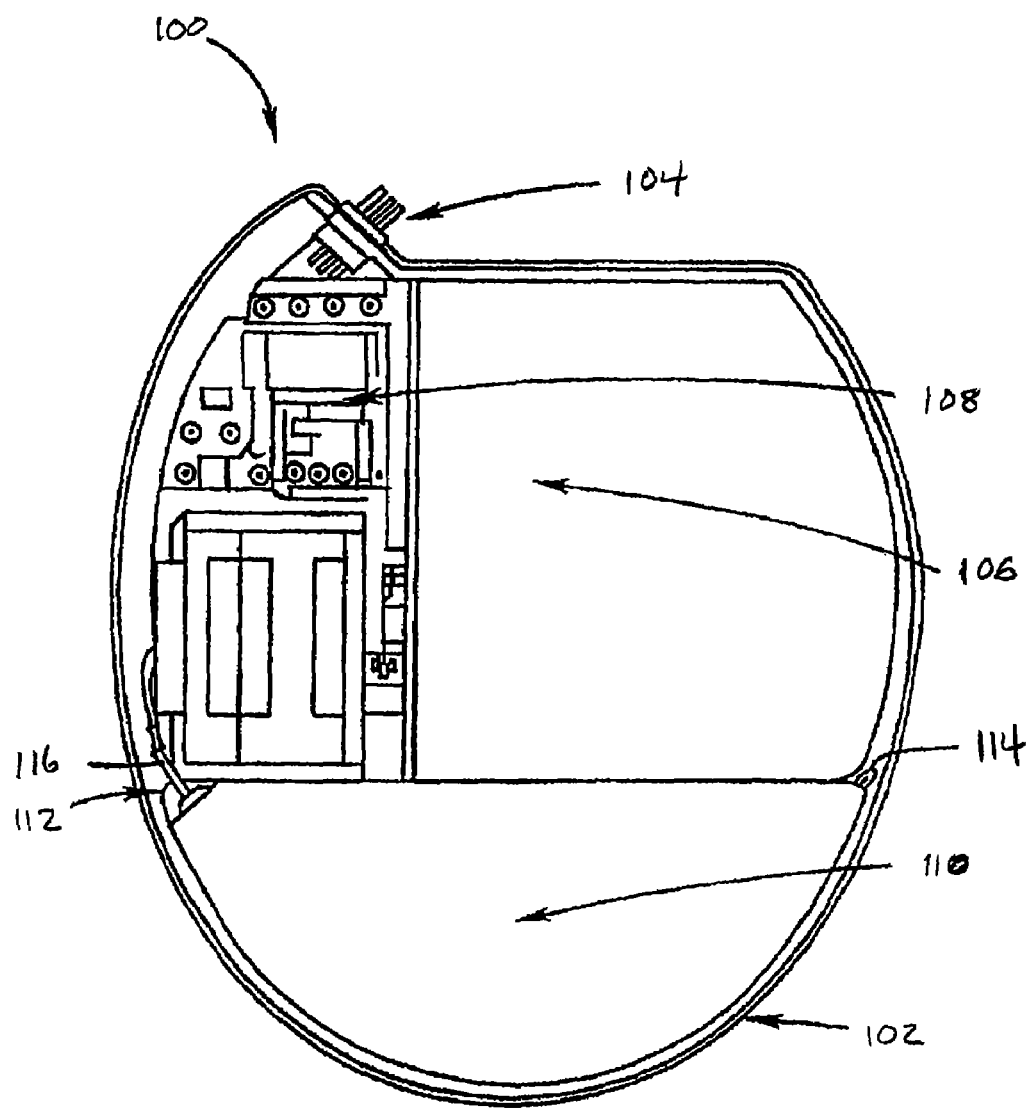
FIG. 1 shows an exemplary implantable medical device.

FIG. 1 illustrates an exemplary ICD 100, having a portion of its outer housing removed to show interior components. ICD 100 includes an outer housing 102 that includes a lead set feed through connector 104 for attachment of an endocardial lead set (not shown). Housing 102 contains a battery cell 106, electronic circuitry 108, and two capacitors 110, 112. Battery 106 provides electrical energy to a transformer in the circuitry 108 to thereafter charge capacitors 110, 112. Capacitors 110, 112 are connected to each other in series through insulated wire 114, and connected to circuitry 108 through insulated wire 116. Capacitors 110, 112 provide the high voltage energy needed so that ICD 100 may deliver a high voltage shock, such as a defibrillating shock, to a patient.

Figure 2:
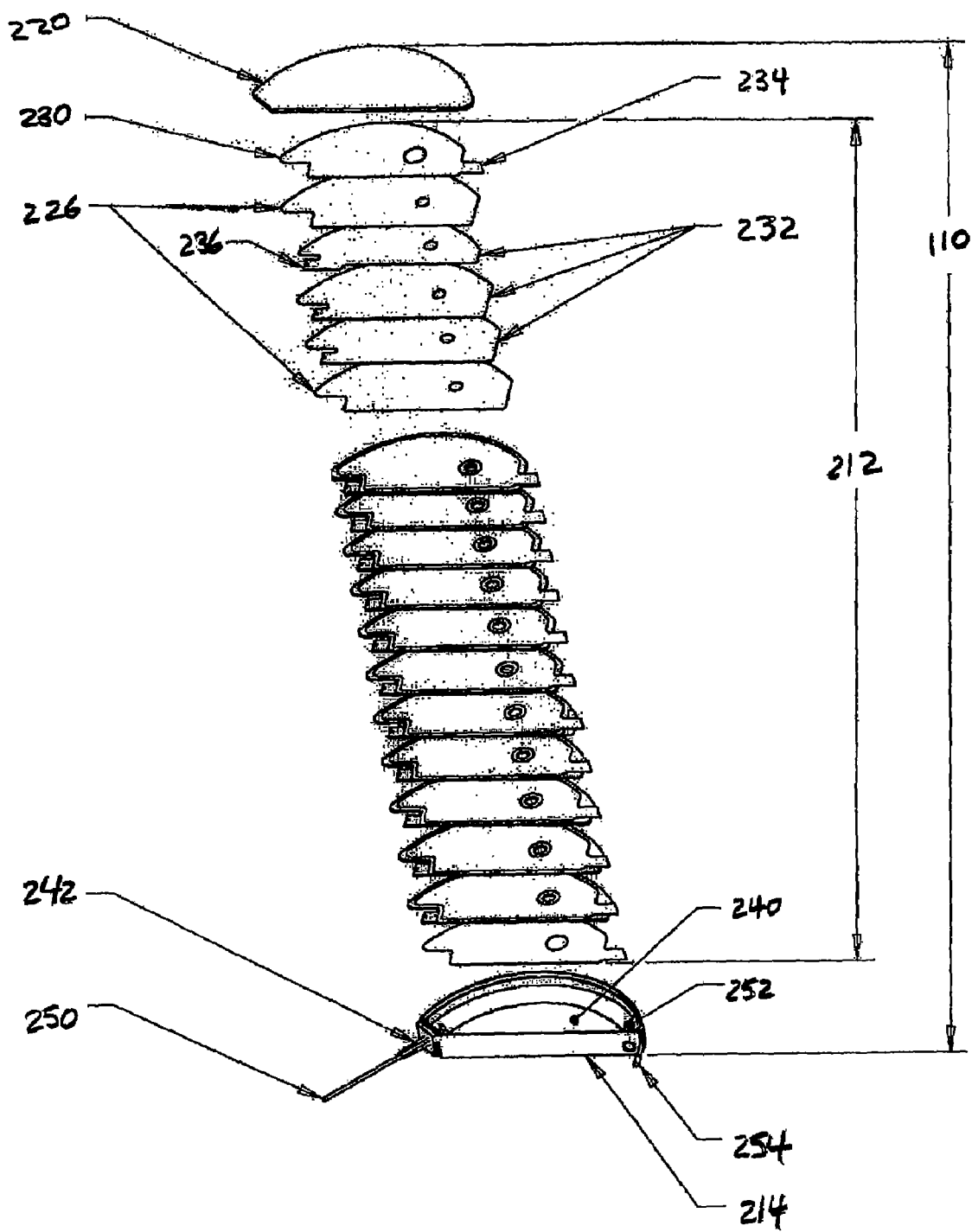
FIG. 2 shows an exploded view of an exemplary electrolytic capacitor having a multiple anode flat-stacked capacitor configuration.

FIG. 2 shows an exploded view of capacitor 110. Although the capacitor shown is a multiple anode flat-stacked capacitor configuration, it is noted that alternative configurations may be employed, as would be apparent to one of ordinary skill in the art. A flat stack 212 consists of alternating conductive and separator sheets within a housing, or base 214, which is enclosed by a lid 220. The sheets alternate between separator sheets 226, and conductive cathode sheets 230 or anode sheets 232. In the spaces formed between adjacent separator sheets, the cathodes alternate with the multiple anodes. Each of the cathodes 230 has a cathode tab 234, all of which are aligned with each other to be compressed together for electrical interconnection. Similarly, each of the anodes 232 has an anode tab 236, aligned with each other to be compressed together for electrical interconnection. The illustration shows each anode layer having three anodes sheets per layer. Alternatively, there may be two or more anodes per layer.

One or both of the end cathodes may be removed, with base 214 connected to the other cathodes and functioning as a cathode. Base 214 defines an aperture 240 in which stack 212 is closely received. Base 214 may be formed of aluminum or alternative materials such as stainless steel, plastic, or other suitable materials. Similarly, lid 220 may be formed of aluminum or alternative materials such as stainless steel, plastic, or other suitable materials. Aperture 240 has a depth about equal to the thickness of stack 212. Base 214 is provided with a feed through connector 242, which has an electrically conductive lead 250 that extends out of the base for connection to other circuitry, with an insulative sleeve surrounding the lead and closely received in a bore defined in the wall of the base to form an environmental seal. Anode tabs 236 are welded together and electrically connected to terminal of feed through 242. Base 214 also includes a cathode attachment step 252 in its interior at a position registered with the ends of cathode tabs 234, so that the tabs may be stacked or welded as a bundle to the step for electrical connection to the base. A cathode lead 254 is directly electrically connected to the base for connection to the cathodes. In an embodiment in which the cathode is isolated from the base, in which the base is non-conductive, or in which cathodes of different groups are isolated from each other, insulated feed throughs like those for the anodes may be used.

Aluminum foil is preferred for the anode layers, because of its ability to produce a sufficient quality oxide layer, its conductive properties, and its wide commercial availability. Other metal foils conventionally utilized in electrolytic capacitors could also be used, including titanium, tantalum, magnesium, niobium, zirconium and/or zinc. For example, the anode layers can be strips or sheets of unetched, high purity (99.99%) aluminum foil with high cubicity, wherein at least 85% of the crystalline aluminum structure is oriented in a normal position (i.e., a (1,0,0) orientation) relative to the surface of the foil. Such foils are well-known in the art and are readily available from commercial sources known to those skilled in the art.

In another embodiment, the anode foil may be etched to increase surface area, such as in an aqueous halide based etch solution, typically a hydrochloric acid or sodium chloride solution, according to a conventional etch process. For example, U.S. Pat. No. 5,715,133 to Harrington et al. describes a suitable method of etching foil, the disclosure of which is incorporated herein by reference in its entirety. The etch solution can consist of about 1.3% by weight sodium chloride, about 3.5% by weight sodium perchlorate, about 0.35% sodium persulfate, and deionized water. The etch solution is heated to a temperature in the range of about 60° C. to about 95° C. The foil is etched at a DC current density of about 0.01 A/cm$^2$ to about 0.30 A/cm$^2$. A charge of about 20 coulombs/cm$^2$ to 100 coulombs/cm$^2$ is passed through the foil during the etching process, which requires an etch time in the range of about 2 minutes to about 12 minutes.

The etched foil is then removed from the etch solution and rinsed in deionized water. The tunnels formed during the initial etch are then widened, or enlarged, in a secondary etch solution, typically in an aqueous based nitrate solution between about 1% to about 20% aluminum nitrate, or between about 10% to about 14% aluminum nitrate, with less than about 1% free nitric acid. The etch tunnels are widened to an appropriate diameter by methods known to those in the art, such as those disclosed in U.S. Pat. No. 4,518,471 and U.S. Pat. No. 4,525,249, both of which are incorporated herein by reference.

After the etch tunnels have been widened, the foil is again rinsed with deionized water and dried. Finally, a barrier oxide layer is formed onto one or both surfaces of the metal foil by placing the foil into an electrolyte bath and applying a positive voltage to the metal foil and a negative voltage to the electrolyte. The barrier oxide layer provides a high resistance to current passing between the electrolyte and the metal foils in the finished capacitor, also referred to as the leakage current. A high leakage current can result in the poor performance and reliability of an electrolytic capacitor. In particular, a high leakage current results in a greater amount of charge leaking out of the capacitor once it has been charged.

The formation process may consist of applying a voltage to the foil through an electrolyte such as boric acid and water or other solutions familiar to those skilled in the art, resulting in the formation of an oxide on the surface of the anode foil. An example electrolyte for formation is a 100-1000 µS/cm, e.g., 500 µS/cm, citric acid concentration. In the case of an aluminum anode foil, the formation process results in the formation of aluminum oxide ($Al_2O_3$) on the surface of the anode foil. The thickness of the oxide deposited or "formed" on the anode foil is proportional to the applied voltage, roughly 10 to 15 Angstroms per applied volt.

The etched and formed anode foils are cut and the capacitor is assembled. A shown in FIG. 2, a multiple anode flat, stacked capacitor configuration 212 consists of a number of units of cathode sheets 230, separator sheets 226, and multiple anode sheets 232. The sheets alternate between separator sheets 226, and conductive cathode sheets 230 or multiple anode sheets 232.

The cathode is preferably formed of a metallic foil of aluminum or titanium, while other alternative metals may be suitable. To increase the capacitance of the cathode, the cathode may be formed of a metallic foil having a metal oxide coating deposited thereon. A paper separator or other fiber with sufficient thickness and density, such as Kraft paper, manila, esparto or hemp, is used to prevent electrical contact between the anode and cathode. Also different porous polymer sheets, such as porous polypropylene, as well as ion conducting polymers, could be used as the separator.

The electrolyte of the present invention is then prepared. In one embodiment a solvent of ethylene glycol and 2-methoxyethanol is prepared and a dicarboxylic acid, such as azelaic acid is dissolved in the solvent. A base, such as ammonia, methylamine or dimethylamine is added to neutralize the acid or make it slightly basic. The base may be bubbled into the electrolyte in a gaseous version or the base may be directly added as an aqueous solution. The base is added until the electrolyte has a desired pH in the 7.0 to 8.5 range.

An indicator dye is also added to the electrolyte in an amount up to 50 ppm, with 5 ppm being preferred. The indicator dye is added to facilitate inspection of the finished capacitor for electrolyte leakage, as discussed below.

An additional advantage of the present invention is in the manufacture of the electrolyte. Typical electrolytes start with ethylene glycol (sometimes a co-solvent is added), in which a dicarboxylic acid such as azelaic acid is dissolved. The acid needs to be neutralized or made slightly basic. Commonly used bases for neutralization of electrolytes include ammonia, methylamine or dimethylamine. In order to keep the water content down, gaseous versions of these bases may be bubbled into the electrolyte rather than using the aqueous solution. Frequent monitoring of the pH of the electrolyte has to occur to keep the pH in the 7.0 to 8.5 range. The addition of an indicator dye that changes color in this range, according to the present invention, assists in the electrolyte production. The gaseous base can be bubbled into the electrolyte until a particular color change in the indicator dye occurs. By the correct selection of the indicator dye, the color change of the electrolyte can assist the operator in reaching the desired pH.

If the indicator dye is utilized for leakage detection only, then it may be added to the electrolyte at any time. If the indicator dye is utilized as a pH indicator then it may be added any time before the addition of the base or simultaneously with the base. In the instance that the indicator dye functions as a pH indicator, the base is added to the electrolyte until the indicator dye changes color indicating that the electrolyte has reached the desired pH.

A conductive electrolyte for use in a high voltage capacitor is composed of a solvent, azelaic acid, an amine and a phosphate compound. Ethylene glycol is the preferred solvent as it has a high dielectric constant. The ethylene glycol constitutes approximately 65% to 90% by weight of the electrolyte.

In a preferred embodiment the conductive electrolyte also includes a co-solvent, such as 2-methoxyethanol, which lowers the viscosity of the electrolyte. The reduced viscosity allows for increased mobility of ionic carriers, which can lead to an improvement in delivered energy. The co-solvent constitutes approximately greater than 0% to 25% by weight of the electrolyte.

The phosphate compound for use in the conductive electrolyte can include hypophosphite compounds, hydrogen phosphate compounds and dihydrogen phosphate compounds. The phosphate compound is added in an amount in a range of 100 to 1,000 parts per million (ppm), with 500 ppm being preferred, and acts to improve the deformation of a capacitor by inhibiting hydration. Improved deformation of the capacitor means a reduced charge time after a prolonged period without voltage. Hypophosphite compounds are preferred and can be added in the form of ammonium hypophosphite or hypophosphorous acid.

Azelaic acid is utilized as the acid rather than boric acid, which is commonly utilized in electrolyte compositions. Boric acid tends to reduce scintillation voltage, but azelaic acid does not. As a result, the electrolyte has a higher working voltage. In addition, the electrolyte has a short cycle time for manufacturer as it only requires heating to between 60 and 70° C., rather than the cooking time of 1 hour at a temperature between 110 and 130° C. required for boric acid to esterify with the ethylene glycol. The azelaic acid constitutes approximately 4% to 15% by weight of the electrolyte, and preferably is about 7% by weight. The azelaic acid may also constitute approximately 4% to 9% by weight of the electrolyte or approximately 7% to 15% by weight of the electrolyte. The greater the weight percentage of the azelaic acid, the greater the conductivity of the electrolyte.

The amine for use in the conductive electrolyte can include ammonia, triethanolamine, monethylamine, dimethylamine and ammonium hydroxide, with ammonia being the preferred amine. Exemplary percentages include, but are not limited to, less than 5% by weight of ammonium hydroxide that is a 28% aqueous solution or about 0.5% to 5% by weight of dimethylamine that is a 40% aqueous solution. The amine is added in sufficient amounts to neutralize the acid and raise the pH of the electrolyte within a range from 7.0 to 8.5. The amine can be bubbled into the composition or added as an aqueous solution.

The conductive electrolyte has a conductivity in a range of 3.8 to 4.5 mS (millisemens) with a water content between 2.3% and 2.8% by weight. Open cup scintillation voltage of the conductive electrolyte is approximately 430 V at 37° C. but in a capacitor with a sufficient anode oxide thickness, the breakdown voltage of the conductive electrolyte is greater than 470 V at 37° C.

A representative composition according to the present invention is: about 76% by weight ethylene glycol, about 25% by weight 2-methoxyethanol, about 7% by weight azelaic acid, about 2.5% by weight ammonium hydroxide in a 30% aqueous solution, about 500 ppm ammonium hypophosphite, and about 5 ppm fluorescein dye, and has a pH of about 8.0. Another representative composition according to the present invention that displays the desired properties is: 76% by weight ethylene glycol, 14% by weight 2-methoxyethanol, 7% by weight azelaic acid, 2.5% by weight ammonium hydroxide (30% solution in water) and 500 ppm ammonium hypophosphite. This mixture is heated until everything dissolves. After cooling, anhydrous ammonia gas is bubbled into the solution until the pH is between 7.8 and 8.2.

This electrolyte may also contain small levels of a coloring agent. Indicator dyes such as curcumin, alizarin, resorcin blue, and others may be used to assist the operator in the addition of the anhydrous ammonia gas. When the color change indicates the right pH, the ammonia addition can stop. Fluorescent dyes, such as fluorescein, can also be included to improve leakage detection. Small electrolyte leaks on a capacitor will fluoresce under a UV light source.

The pre-assembled capacitor is then vacuum impregnated with the electrolyte of the present invention in a normal manner. In one embodiment, a pre-dried capacitor is placed in contact with the electrolyte and the pressure is reduced to less than 50 cm Hg while the temperature is elevated at the same time from 50° C. to 85° C., with 65° C. being preferred. After the capacitor is held at a low pressure for five to forty-five minutes the pressure is restored, forcing the electrolyte mixture into the capacitor stack. The capacitor remains at atmospheric pressure at the elevated temperature for another five to forty-five minutes in order to allow the paper to further swell and absorb more electrolyte. The capacitor is then aged in a normal manner by applying a working voltage to the capacitor, allowing the capacitor to reach the working voltage, and then allowing the current to decrease. The capacitor may then be reimpregnated to replace the electrolyte ejected by the hydrogen gas produced in the aging process. Next the capacitor is seal plugged and is brought to a cap tester for measuring the electrical performance of the capacitor. Then the capacitor sits in a pool waiting for the pairing process to another capacitor.

Electrolytic capacitors according to the present invention can be incorporated into implantable medical devices, such as implantable cardioverter defibrillators (ICDs), as would be apparent to one skilled in the art, as described in U.S. Pat. No. 5,222,851 issued to Fayram.

The inspection of the capacitor for electrolyte leakage can occur at numerous points during the capacitor manufacturing, including, but not limited to, after the aging, pairing, reimpregnating or seal plugging steps. Electrolyte can leak through pinholes in the weld zones between the housing and lid of the capacitor or up the anode wire through the feed through. The electrolyte leaks in miniscule amounts and is extremely difficult to see without the indicator dye.

The inspection involves visually inspecting for the presence of the indicator dye, which can be easily detected with enhanced speed and accuracy as a result of the indicator dye being a coloring agent that changes the color of the electrolyte. By adding an indicator dye, the difficulty of the visual inspection is decreased and the speed and accuracy of the capacitor assembly process is improved. If a fluorescent indicator dye is used, the dye will fluoresce when exposed to ultraviolet light. A fluorescent indicator may also be used in an automated process in which the capacitor is placed in a visually darkened area and exposed to UV light which causes the indicator to fluoresce. A machine vision system can quickly examine the capacitor for any visual glow from the fluorescent indicator. By use of the indicator dyes, the electrolyte leak is made more apparent to the operator and will make differentiation between electrolyte and solder flux easier.

The indicator dye can be a normal coloring agent indicator or one that fluoresces under ultraviolet light. The indicator dye should not contain halides, should not contain metal ions, such as iron or copper, and should not polymerize or otherwise interfere with the performance of the electrolyte. The indicator dye should be stable for long term use and should be organic, containing oxygen, hydrogen, carbon, nitrogen, or sulfur as the main components. Suitable indicator dyes include, but are not limited to, fluorescein, resorcin blue, alizarin, curcumin, brilliant yellow, and β-methylumbelliferone (7-hydroxy 4-methylcoumarin). Such indicator dyes are well-known in the art and are readily available from commercial sources known to those skilled in the art.

The indicator dye can be utilized for both electrolyte leakage protection and as a pH indicator. Indicator dyes that are coloring agents and pH indicators that could be utilized include, but are not limited to, alizarin, curcumin, and resorcin blue. Indicator dyes that fluoresce and are pH indicators that could be utilized include, but are not limited to, fluorescein and β-methylumbelliferone (7-hydroxy 4-methylcoumarin).

The foregoing description of the specific embodiments will so fully reveal the general nature of the invention that others can, by applying knowledge within the skill of the art (including the contents of the references cited herein), readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance presented herein, in combination with the knowledge of one of ordinary skill in the art.

EXAMPLES

Example 1

| | |
|---|---|
| Ethylene glycol | 250.6 g |
| Azelaic acid | 25.0 g |
| Ammonia (aq) | 5.3 g |
| Ammonium Hypophosphite | 0.079 g |
| 2-methoxyethanol | 45.0 g |
| alizarin | trace amounts |

Ethylene glycol, azelaic acid, aqueous ammonia, 2-methoxyethanol and ammonium hypophosphite were mixed together and heated. The alizarin was added in a trace amount as a pH indicator dye. The mixture was allowed to cool and then additional ammonia was sparged into the mixture to adjust the pH. The electrolyte turned from a deep yellow to a cranberry red during the sparging of ammonia.

Example 2

| | |
|---|---|
| Ethylene glycol | 250.0 g |
| Azelaic acid | 25.1 g |
| Ammonia (aq) | 5.0 g |
| Ammonium Hypophosphite | 0.0745 |
| 2-methoxyethanol | 45.0 g |
| 1% alizarin | 25 drops in the 2-methoxyethanol |

The electrolyte was prepared in the same manner as example 1. The electrolyte turned a violet color during the adjustment of the pH.

Example 3

| | |
|---|---:|
| Ethylene glycol | 192.2 g |
| Azelaic acid | 19.3 g |
| Ammonia (aq 29%) | 3.5 g |
| Ammonium Hypophosphite | 0.0675 g |
| 2-methoxyethanol | 34.8 |
| 1% fluorescein in methanol | 10 drops |

The electrolyte was prepared in the same manner as example 1. The drops of fluorescein solution were added as a pH indicator. The fluorescein fluoresced as green in color.

Example 4

| | |
|---|---:|
| Ethylene glycol | 200.0 g |
| Azelaic acid | 32.0 g |
| Dimethylamine (aq 40%) | 10.0 g |
| Ammonium Hypophosphite | 0.10 g |
| 2-methoxyethanol | 30.0 g |
| 0.5% curcumin in methanol | 10 drops |

The electrolyte was prepared in the same manner as example 1 with the exception that dimethylamine gas, rather than the ammonia gas, was sparged into the mixture to adjust the pH.

Example embodiments of an electrolytic capacitor and a method for detection of electrolyte leakage and electrolyte pH have been described. As noted elsewhere, these example embodiments have been described for illustrative purposes only, and are not limiting. Other embodiments are possible and are covered by the following claims. Such embodiments will be apparent to persons skilled in the relevant art(s) based on the teachings contained herein.

What is claimed is:

1. A conductive electrolyte for high voltage electrolytic capacitors, comprising:
    ethylene glycol in an amount from about 65% to about 90% by weight
    2-methoxyethanol in an amount from greater than 0% to about 25% by weight;
    azelaic acid in an amount from about 4% to about 9% by weight;
    ammonium hydroxide in a 28% aqueous solution in an amount less than 5% by weight;
    ammonium hypophosphite in an amount from about 100 to about 1000 ppm; and
    fluorescein dye in an amount not more than 50 ppm.

2. A conductive electrolyte for high voltage electrolytic capacitors, comprising:
    ethylene glycol in an amount from about 65% to 90% by weight;
    2-methoxyethanol in an amount from greater than 0% to about 25% by weight;
    azelaic acid in an amount from about 7% to 15% by weight;
    dimethylamine in a 40% aqueous solution in an amount from about 0.5% to 5% by weight;
    ammonium hypophosphite in an amount from about 100 to about 1000 ppm; and
    fluorescein dye in an amount not more than 50 ppm,
    wherein the electrolyte has a pH in a range of 7.0 to 8.5.

* * * * *